United States Patent [19]

Blankenburg

[11] Patent Number: 4,898,493

[45] Date of Patent: Feb. 6, 1990

[54] METHOD AND APPARATUS FOR ASSEMBLING PARTS

[76] Inventor: Karl Blankenburg, 42050 Executive Dr., Mt. Clemens, Mich. 48045-3488

[21] Appl. No.: 324,452

[22] Filed: Mar. 16, 1989

[51] Int. Cl.⁴ .............................................. B25G 3/00
[52] U.S. Cl. ................................ 403/407.1; 411/508; 52/511
[58] Field of Search .......................... 403/406.1, 407.1; 52/511; 411/508, 509, 510; 24/694

[56] References Cited

U.S. PATENT DOCUMENTS

| | | | |
|---|---|---|---|
| 2,653,686 | 9/1953 | Routt | 52/511 X |
| 3,320,712 | 5/1967 | Rapata | 52/511 |
| 3,403,641 | 10/1968 | Baker | 403/407.1 X |
| 3,741,594 | 6/1973 | Ostling | 403/407.1 |
| 3,875,843 | 4/1975 | Maeda et al. | 411/508 X |
| 4,534,088 | 8/1985 | Ricke | 24/293 X |

Primary Examiner—Andrew V. Kundrat
Attorney, Agent, or Firm—Barnes, Kisselle, Raisch, Choate, Whittemore & Hulbert

[57] ABSTRACT

A method and apparatus for joining parts together in spaced relation especially in production assemblies which includes a plurality of carrier elements to be fastened to one part by conventional fastening elements. A plurality of receiver elements are fastened to a second part by being integrally molded to that part or bonded by sonic welding or adhesives or other appropriate fastening means. The carrier elements and the receiver elements are shaped to telescope together and interlock when so telescoped. The parts are prepared independently with similar orientation of the carrier and receiver elements. The final assembly is achieved when the parts are brought together and the elements interlocked in the telescoping relationship.

8 Claims, 3 Drawing Sheets

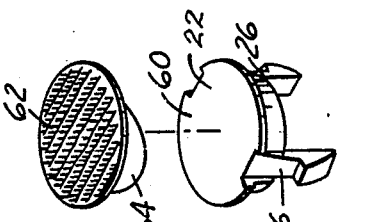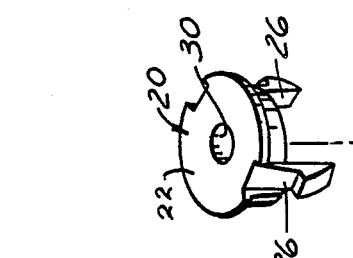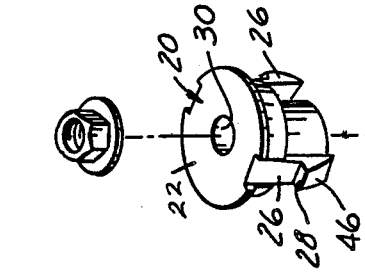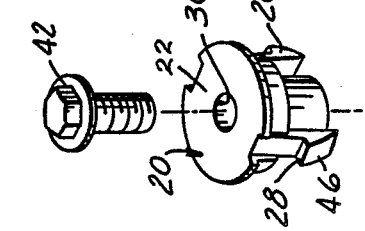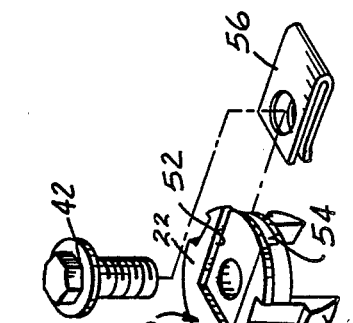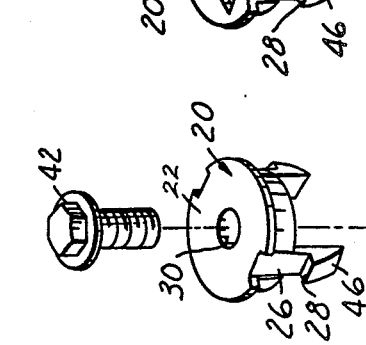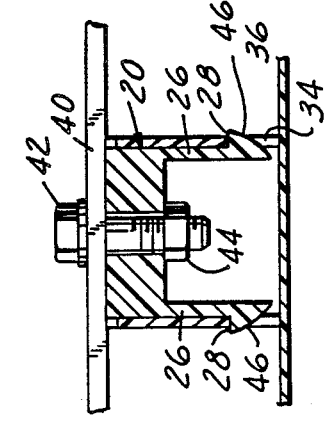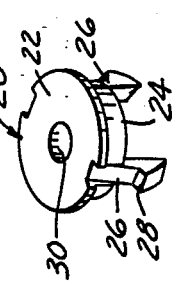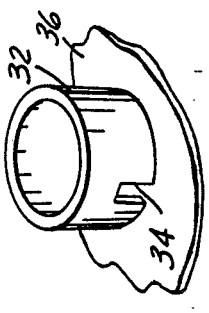

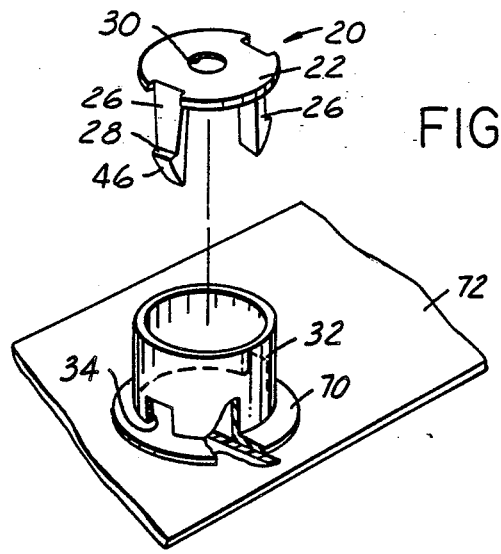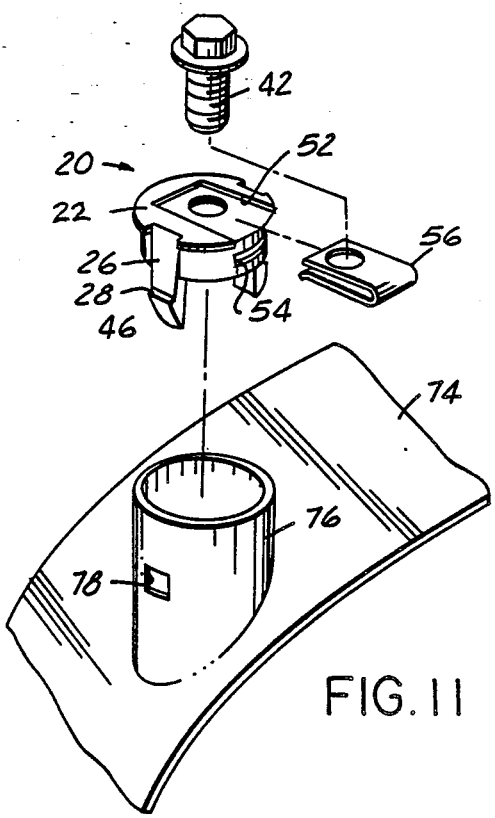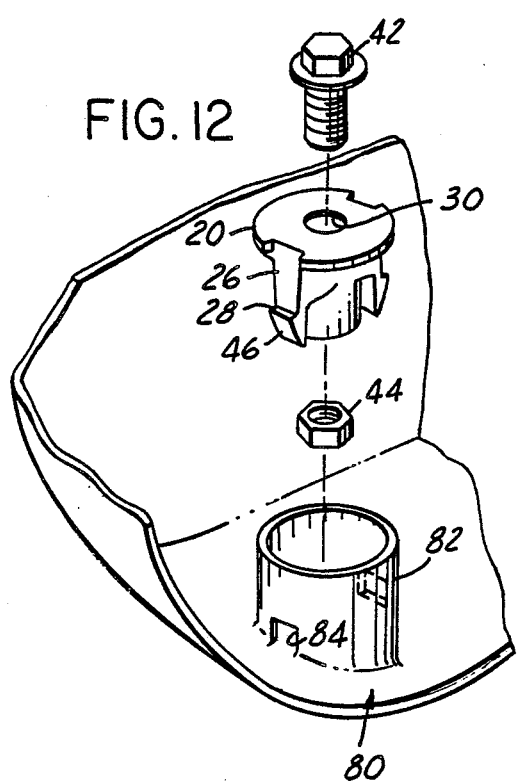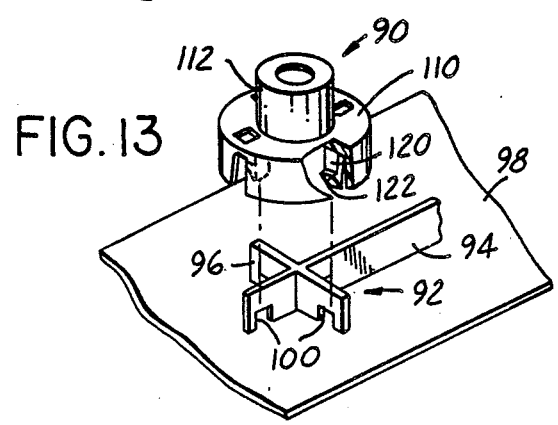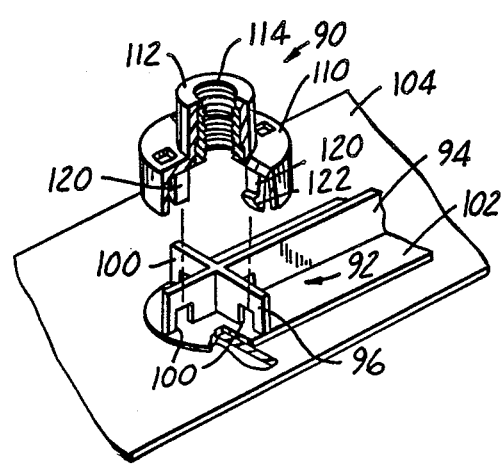

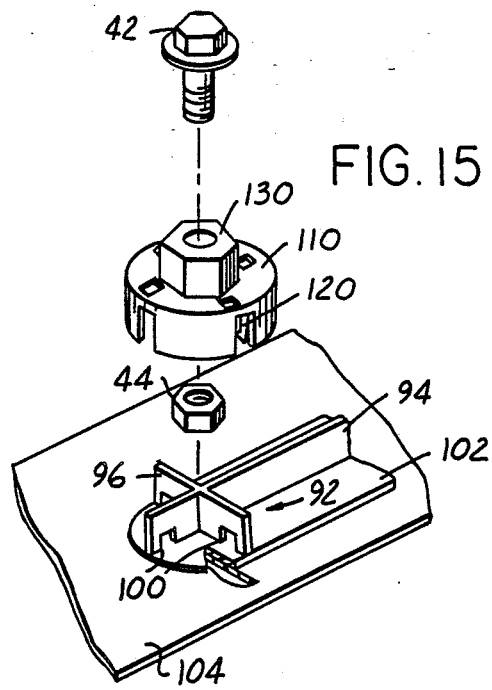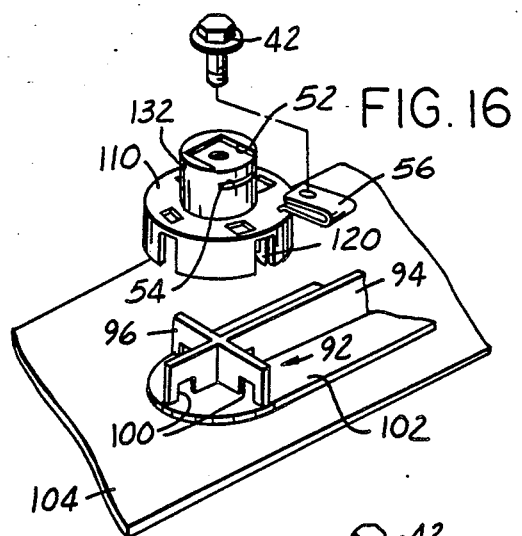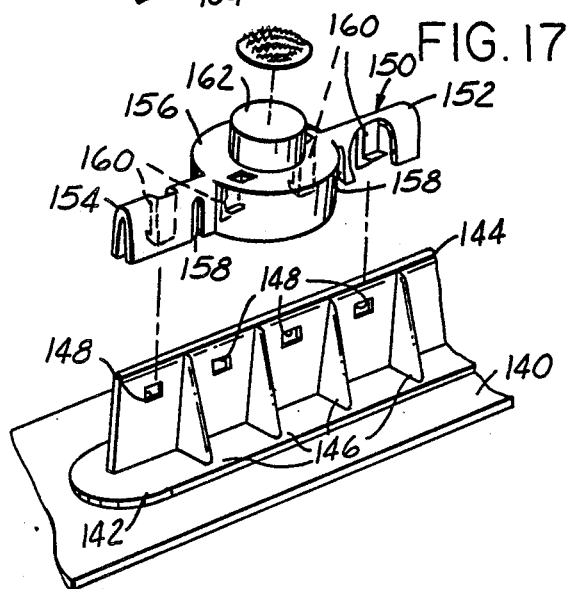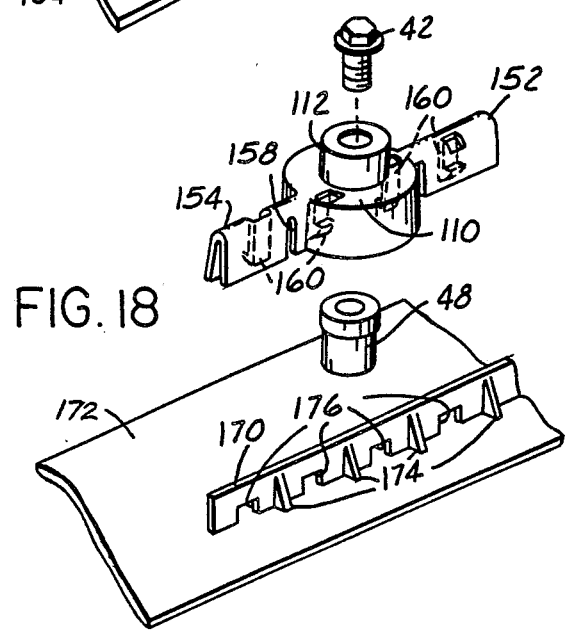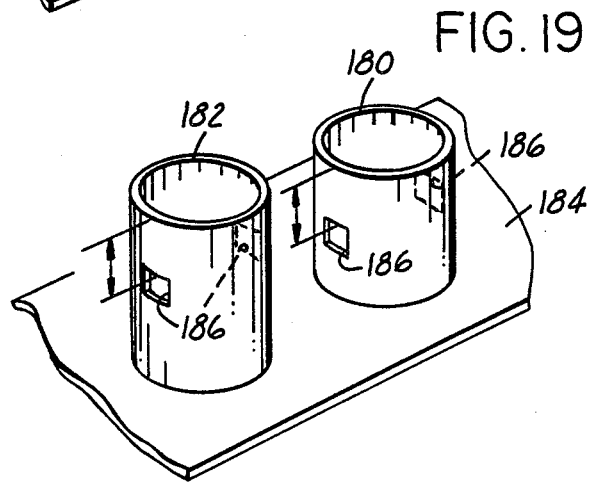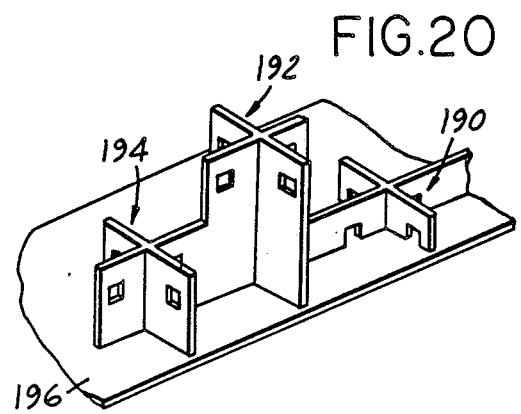

METHOD AND APPARATUS FOR ASSEMBLING PARTS

FIELD OF INVENTION

Interlocking fasteners of numerous types combined with unified carriers to engage unified receivers on parts and panels to be joined to various other portions of an assembly.

BACKGROUND AND FEATURES OF THE INVENTION

In modern assembly procedures, speed and accuracy are extremely important to avoid slowdown in assembly lines and insure effective joining of parts. In addition, many varieties of fasteners are used to join parts. Most of these fasteners must be applied by hand which is, of course, a time consuming operation. The object of the present invention is to provide a system and structures for pre-assembly of fasteners to one part of an assembly with unified carriers. This carrier can then be quickly connected to a unified receiver with a push-on motion requiring no tools or manual manipulation.

More particularly, the invention contemplates a plurality of carriers each adapted to receive a particular type of fastener as, for example, bolts and nuts, spring clips, Christmas tree projection fasteners, interlocking fibers and so forth. A first part, such as a panel, is prepared by fastening to one side a series of unified carriers by any means selected among available fasteners. A second part to be assembled is prepared by molding with it or fastening to it, by a suitable adhesive or sonic welding, a series of unified receivers spaced in coordination with the fasteners on the first part. The unified carrier is designed to have a sliding telescopic interlocking fit with the unified receiver. Accordingly, an unskilled worker can assemble the prepared parts with a simple press-on motion.

Various types of fasteners and receivers are illustrated in connection with the following description in which the best modes contemplated for the invention are disclosed and described.

BRIEF DESCRIPTION OF THE DRAWINGS

DRAWINGS accompany the disclosure and the various views thereof may be briefly described as:

FIG. 1, an exploded view of the two main elements of the invention.

FIG. 2, a view of the elements of FIG. 1 assembled.

FIG. 3, a sectional view on line 3—3 of FIG. 2.

FIGS. 4 to 9, views of six different fastening devices which can be utilized.

FIG. 10, an exploded view of two elements modified from those illustrated in FIG. 1.

FIG. 11, a view of the system adapted to a part with a convex curvature.

FIG. 12, a view of the system adapted to a concave curvature.

FIG. 13, a second modification of basic elements of the invention a to cross-ribs.

FIG. 14, a view similar to FIG. 13 with the rib elements bonded to the base element.

FIG. 15, a view of the rib system with a nut adapter.

FIG. 16, a view of the rib system with a clip adapter.

FIG. 17, a view of a rib system with a receiver unit bonded to a panel element.

FIG. 18, a modified rib system with a receiver unit molded with a receiver panel.

FIG. 19, a view of a receiver unit similar to FIGS. 1 and 2 illustrating how a boss receiver element can be varied in a spacing dimension.

FIG. 20, a view of a rib assembly receiver unit illustrating varying attachment heights.

DETAILED DESCRIPTION OF THE INVENTION AND THE MANNER AND PROCESS OF USING IT

With reference to the drawings, the modification of FIG. 1 shows a unified carrier 20 formed as a circular disc 22 below which is a collar 24 from which depends resilient latching tabs 26 each having a shoulder 28. The plate 22 has a central opening 30 to receive standard fasteners as will be described.

A unified receiver, as illustrated in FIG. 1, is a hollow cylindrical element 32 having opposed recesses 34 to receive the tabs 26 in an interlocking relationship. The cylindrical body 32 can be attached to a panel plate 36 either by being molded with it or cemented or sonic welded to it. In FIG. 1, the body 32 is molded with the panel 36. In FIG. 2, the unified carrier 20 and unified receiver 32 are shown in assembled relation with the tabs 26 received in the openings 34. The elements 20 and 32 are formed in accordance with proper molding practice with an appropriate draft angle to permit removal from a mold. The interruptions in the top disc 22 are provided in this connection.

In FIG. 3, the assembly is shown in cross-section. The carrier 20 has been pre-assembled on a panel section 40 by a headed bolt 42 secured by a nut 44. In assembly, the carrier 20 is oriented on the panel sections so that the tabs 26 register with the openings 34 in the receiver. Thus, with a plurality of carriers on a panel section and a similar number of receivers on the plate 36, the final assembly of the two panels 36 and 40 is accomplished by simply pressing the plates together causing the tabs 26 to engage the openings 34 in the receiver. The tabs 26 are preferably formed with tapered outside surfaces 46 (FIG. 3) to cam into the receiver cylinder 32 during the assembly movement.

FIGS. 4 to 9 illustrate the carrier elements with a variety of standard fasteners. In FIGS. 4, 6, 7 and 8, the carrier 20 is the same as illustrated in FIG. 1. Various bolt and nut fasteners are used except in FIG. 8 where a Christmas tree type of fastener 50 is shown. In FIG. 4, a threaded insert adapter 48 is used. In FIGS. 6 and 7, a bolt-nut fastener is used. In FIG. 5, the disc 22 is modified to have a top recess 52 and a side recess 54 to receive the spaced tabs of a perforated U-shaped clip 56 which receives the threaded shank of a bolt 42. FIG. 9 shows a smooth top disc 60 designed to receive a Velcro (T.M.) disc 62 which has an adhesive back protected by a sheet 64 until moved prior to application.

Thus, FIGS. 4 to 9 illustrate the use of the carriers 20 with a variety of standard fasteners and there are others which can be similarly applied.

In FIG. 10, an assembly is depicted similar to that shown in FIGS. 1 and 2 except that the base receiver element has formed thereon an integral base flange 70 which along with the base is bonded to the panel plate 72 by sonic welding or a high strength adhesive. The carrier element 20 is the same as illustrated in previously described embodiments with tabs 26 to engage recess 34 in the receiver.

In FIGS. 11 and 12, there is illustrated adaptation of the carrier-receiver system to curved surfaces. In FIG. 11, a convex base panel 74 has molded integrally therewith a cylindrical boss 76 with opposed latch openings 78 to cooperate with the latch tabs 26 of a carrier unit 20. In this case, a carrier unit 20, as illustrated and described in connection with FIG. 5, is shown. In FIG. 12, a receiver panel 80 with a concave curvature is illustrated having an integral upstanding receiver boss 82 with opposed latch openings 84 to cooperate with a carrier element 20 as illustrated and described in connection with FIG. 6.

In FIGS. 13 to 16, modified carrier elements and receiver elements are illustrated. In FIG. 13, a carrier element 90 cooperates with what will be termed a rib receiver 92. The rib receiver comprises two upstanding ribs 94 and 96 at right angles to each other integrally molded with a panel 98. Openings 100 at the base of the ribs are provided to cooperate with latch elements in the carrier element. In FIG. 14, a similar rib receiver 92 is formed integrally with plate base 102 and suitably bonded on to a base element 104.

The carrier element 90 in FIGS. 13 and 14 comprises a hollow cylindrical base 110 topped by a concentric boss 112 which, as shown in FIG. 14, may have a threaded bore 114 to receive a carrier bolt. The boss 112 in FIG. 13 is adapted for use with a bolt and nut as in FIGS. 6 or 7. The base 110 has formed internally thereof depending flexible tabs 120 with latch projections 122 which engage openings 100 in the cross-ribs 94,96 when the carrier elements 90 is moved into engagement with the ribbed receiver element 94–96.

FIGS. 15 and 16 show similar cross-rib receiver elements bonded, as in FIG. 14, to the base of plate 104. The top boss 130 in FIG. 15 is used with a bolt-nut fastener and has a hexagonal shape. The top boss 132 in FIG. 16 is used with a spring clip fastener as shown in FIG. 5.

In each of the embodiments of FIGS. 13 to 16 the carrier elements 110 would be suitably affixed to a sheet panel such as 40 in FIG. 3 and moved into axial alignment with the cross-rib receivers 94, 96 and locked in place as the latch elements snap into openings 100.

FIGS. 17 and 18 illustrate still another modification of a carrier unit and a receiver unit again to be used with conventional fasteners. In FIG. 17, a receiver unit comprises a panel 140 on which is bonded a base plate 142 having thereon an upstanding rib 144 reinforced by gussets 146 and having spaced latch holes 148. The carrier element in FIG. 17 is an elongate element 150 having a U-shaped channel extension 152,154 on each side diametrically disposed on the carrier base 156. The facing leg of the extension is slotted at 158 to accommodate the gussets 146, and the rearward leg of the channel extensions as well as base 156 are formed with latch tabs 160 facing alternately in opposite directions to engage the openings 148 from opposite sides. The top boss 162 in this case utilizes the Velcro (T.M.) fastener disc 62 of FIG. 9.

In FIG. 18, a similar carrier unit to that illustrated in FIG. 17 is shown but in this embodiment a bolt 42 and threaded insert 48 are used as depicted in FIG. 4. The receiver element is an elongate rib 170 formed integrally with the base panel 172 with reinforcing gussets 174 and latch openings 176. Except for the difference in height of the ribs 144 and 170, the operation is the same with the channel rib extensions 152,154 receiving the rib 170 and being latched securely to it.

In FIGS. 19 and 20, receiver units are shown with varying heights to illustrate the versatility of the system. In FIG. 19, two bosses 180, 182 of different heights are shown on the base panel 184 and latch openings 186 are spaced down from the top with a similar dimension so standard carrier units could be used with each. This would accommodate a bend or jog in the carrier panel at the juncture between the bosses 180 and 182. FIG. 20 similarly shows cross-ribbed receiver units 190,192 and 194 at varying heights on a base panel 196 to cooperate with carrier units illustrated in FIGS. 13 to 16.

The basic concept here lies in providing carrier elements of uniform construction and receiver elements which are similarly uniform, these elements to be assembled in a telescoping interlock motion. The elements can be attached to the parts to be assembled by various standard devices selected as most effective or expedient by the designers. The concept involves pre-assembly of the carriers and receivers to the parts to be joined under conditions conducive to individual treatment. The final joining of the parts in an assembly line, for example, then becomes just a matter of pressing the parts together with no individual treatment necessary of individual fasteners.

It will be appreciated that the resilient snap-in tabs which are shown on the carrier elements could be formed on the receiver elements and the receiving apertures could be provided on the carrier elements.

What is claimed is:

1. A system for joining parts together in spaced relationship such as opposed panels which comprises:
   (a) a plurality of carrier elements,
   (b) a plurality of receiver elements,
   (c) means on said elements to interlock in engagement when said elements are moved axially into a juxtaposed position,
   (d) a first part fastened to one or more carrier elements by conventional fastening means,
   (e) a second part fastened to one or more receiver elements by conventional fastening means,
   (f) said parts being joined together when said carrier element and receiver element are moved together,
   (g) said carrier elements comprising a hollow cylindrical body portion having a perforate top to receive bolt fasteners and resilient, dependent leg portions, a lateral latch projection on each of said leg portions, and
   (h) said receiver elements comprising a hollow cylindrical body portion dimensioned to have a sliding fit with said carrier element, and apertures formed in the wall of said receiver elements to receive said latch portions in an interlock engagement when said elements are telescoped together.

2. A system for joining parts together in spaced relationship such as opposed panels which comprises:
   (a) a plurality of carrier elements,
   (b) a plurality of receiver elements,
   (c) means on said elements to interlock in engagement when said elements are moved axially into a juxtaposed position,
   (d) a first part fastened to one or more carrier elements by conventional fastening means,
   (e) a second part fastened to one or more receiver elements by conventional fastening means,
   (f) said parts being joined together when said carrier element and receiver element are moved together,
   (g) said carrier elements each comprising a hollow cylindrical body having a top to receive a conventional fastener and having depending leg portions and a lateral latch projection on each of said leg portions, and (h) said receiver element comprising an upstanding ring on said second part having a transverse opening formed therein, said body being recessed to receive said rib whereby said latch projections may enter said openings to lock said elements together.

3. A system for joining parts together in spaced relationship such as opposed panels which comprises:
  (a) a plurality of carrier elements,
  (b) a plurality of receiver elements,
  (c) means on said elements to interlock in engagement when said elements are moved axially into a juxtaposed position,
  (d) a first part fastened to one or more carrier elements by conventional fastening means,
  (e) a second part fastened to one or more receiver elements by conventional fastening means,
  (f) said parts being joined together when said carrier element and receiver element are moved together,
  (g) said carrier elements comprising a first rib-like element having a first wall normal to said first part and resilient tabs on said first wall having lateral projections, and
  (h) a receiver element comprising a second rib-like element on a receiver element shaped to lie adjacent said first wall in a sliding fit, and recesses formed on said second rib-like element to receive and interlock with said lateral projections when said elements are telescoped together.

4. A system as defined in claim 3 in which said first rib-like element comprises a U-shaped elongate channel member with the bight of the U facing the carrier element and resilient wall tabs on at least one leg of the channel member, and a second rib-like member on a receiver element shaped to enter the channel of said U-shaped member and having openings to receive the wall tabs on said channel member to latch the two members together.

5. A system as defined in claim 3 in which said carrier elements each comprise a body member having depending latch tabs positioned on diameters normal to each other and said receiver element comprises ribs on said receiver element disposed at right angles to each other and positioned to be received by said body member and having openings to receive said latch tabs to lock said elements together.

6. A system as defined in claim 3 in which said carrier elements each comprise a body member having depending latch tabs in a line on said body, and channel extensions on each side of said body aligned with said line also having latch tabs on a wall of the channel, and a receiver element comprises an elongate rib positioned to be received on said body and said channel extensions having openings to receive said latch means to lock said elements together.

7. A system as defined in claim 6 in which each said carrier element comprises a hollow cylindrical, inverted cup-shaped body having depending latch tabs on a diameter of said body and a boss atop said body to receive a conventional fastener to secure said first part to said carrier element.

8. A system for joining parts together in spaced relationship such as opposed panels which comprises:
  (a) a plurality of carrier elements,
  (b) a plurality of receiver elements,
  (c) means on said elements to interlock in engagement when said elements are moved axially into a juxtaposed position,
  (d) a first part fastened to one or more carrier elements by conventional fastening means,
  (e) a second part fastened to one or more receiver elements by conventional fastening means,
  (f) said parts being joined together when said carrier element and receiver element are moved together,
  (g) each said carrier element comprising a hollow body having depending resilient tabs and lateral latch projections thereon arranged in two planes normal to said first part and at angles to each other, and
  (h) said receiver element comprising two or more ribs at angles to each other to register with said depending tabs and having openings to engage said respective tabs when said elements are moved together.

* * * * *